United States Patent [19]
Molnar et al.

[11] Patent Number: 5,878,093
[45] Date of Patent: Mar. 2, 1999

[54] INTERFERENCE REJECTION COMBINING WITH FREQUENCY CORRECTION

[75] Inventors: Karl James Molnar; Gregory Edward Bottomley, both of Cary, N.C.

[73] Assignee: Ericsson Inc., Research Triangle Park, N.C.

[21] Appl. No.: 766,081

[22] Filed: Dec. 16, 1996

[51] Int. Cl.$^6$ .................................................. H04L 1/02
[52] U.S. Cl. .......................................... 375/347; 455/139
[58] Field of Search .................................... 375/267, 347, 375/340, 344; 455/132, 137, 139

[56] References Cited

U.S. PATENT DOCUMENTS

| | | | |
|---|---|---|---|
| 5,109,544 | 4/1992 | Mittel et al. | 455/182 |
| 5,136,616 | 8/1992 | Dent | 375/94 |
| 5,150,382 | 9/1992 | Kume | 375/88 |
| 5,321,850 | 6/1994 | Backstrom et al. | 455/139 |
| 5,461,646 | 10/1995 | Anvari | 375/347 |
| 5,469,478 | 11/1995 | Lee | 375/374 |
| 5,479,453 | 12/1995 | Anvari et al. | 375/348 |
| 5,481,572 | 1/1996 | Skold et al. | 375/347 |
| 5,684,836 | 11/1997 | Nagayasu et al. | 375/347 |

FOREIGN PATENT DOCUMENTS

| | | |
|---|---|---|
| 0 381 636 A1 | 8/1990 | European Pat. Off. . |
| 2 260 454 | 4/1993 | United Kingdom . |
| WO 96/04738 | 2/1996 | WIPO . |

OTHER PUBLICATIONS

*Adaptive Arrays and MLSE Equalization* by G.E. Bottomley, K. Jamal: Proc. 1995 IEEE 45th Vehicular Technology Conference (VTC '95), Chicago, Jul. 25–28, 1995; pp. 1–5.

Chuang, et al., "Burst Coherent Demodulation with Combined Symbol Timing, Frequency Offset Estimation, and Diversity Selection," *IEEE Transactions on Communications* 39 (1991): 1157–1164.

Larosa, C.P., et al., "A Fully Digital Hardware Detector For π/4 QPSK," *From Pioneers of the 21st Century*, Denver, 1 (May 1992): 293–297.

Wong, P.B., et al., "Low–complexity Diversity Combining Algorithms and Circuit Architectures for Co–channel Interference Cancellation and Frequency–Selective Fading Mitigation," *1996 IEEE International Conference on Communications (ICC), Coverging Technologies for Tomorrow's Applications*, Dallas, 2 (1996): 879–885.

International Search Report for PCT/US 97/10201, dated Jun. 19, 1998.

*Primary Examiner*—Tesfaldet Bocure
*Attorney, Agent, or Firm*—Jenkens & Gilchrist

[57] ABSTRACT

In a communications system wherein a broadcast signal is received by a plurality of antennas each connected to a receiver, the resulting plurality of received signals are jointly subjected to automatic frequency correction (AFC) before interference rejection combining (IRC) or maximal ratio combining (MRC) processing to output an estimate of the broadcast signal. The joint automatic frequency correction processing involves computing and applying a frequency offset on a sample by sample basis to each of the received signals to output corresponding frequency corrected received signals for IRC or MRC processing.

14 Claims, 5 Drawing Sheets

INTERFERENCE REJECTION COMBINING WITH FREQUENCY CORRECTION

BACKGROUND OF THE INVENTION

1. Technical Field of the Invention

The present invention relates to a process for interference rejection combining of received radio signals and, in particular, to the correction of a common frequency offset experienced with respect to the interference rejection combining process for radio signals received at multiple antennas.

2. Description of Related Art

Figure 1:
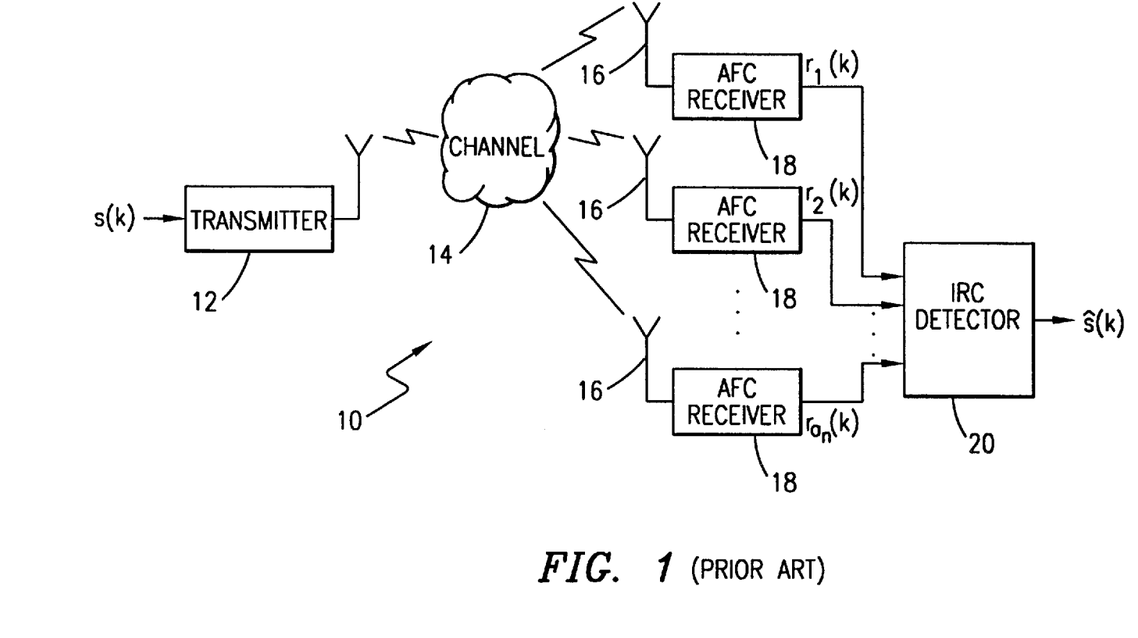
FIG. 1 (previously described) is a block diagram of a multi-antenna communications system as in the prior art implementing automatic frequency control (AFC) for each individual receiver chain and an interference rejection combining (IRC) detector.

Reference is now made to FIG. 1 wherein there is shown a block diagram of a communications system 10. An information symbol sequence s(k) is pulse shaped and modulated onto a radio frequency carrier by a radio transmitter 12. The modulated and transmitted signal passes through a radio frequency channel 14. Such a signal may be lost or degraded during such transmission due to the effects of multipath fading and interference. Multipath fading comprises two basic effects: flat fading and time dispersion. Flat fading arises from the interaction of the transmitted signal and reflections (echoes) thereof received at the same time. Time dispersion occurs when the echoes are delayed with respect to the transmitted signal. Interference arises from the existence in the radio environment of noise and of signal sources which are not orthogonal to the transmitted signal. Such signals are often emitted from radio transmitters operating on the same frequency as the transmitted signal (co-channel interference), or from transmitters operating on a neighboring frequency as the transmitted signal (adjacent channel interference).

The transmitted signal (including the echoes and interference) is received by a plurality of antennas 16. A receiver 18 associated with each antenna 16 filters and down-converts the received signal to a complex baseband received signal sequence r(k). A detector 20 collects and processes the plural signal sequences r(k) to produce an estimate ŝ(k) of the originally transmitted information symbol sequence s(k).

Operation of the detector 20 in an Interference Rejection Combining (IRC) mode to output the estimate ŝ(k) is well known in the art. For example, a number of implementations for the detector 20 are disclosed in U.S. Pat. No. 5,680,419, entitled "Method of and Apparatus for Interference Rejection Combining in Multi-Antenna Digital Cellular Communications Systems", Gregory Bottomley, inventor. In accordance with the foregoing disclosure, channel taps are estimated by the decoder 20 for each of the antennas 16. Impairment correlation properties are also estimated. Branch metrics are then formed in a processor using the received signals r(k), the channel tap estimates, and the impairment correlation estimates. The branch metrics are then employed in a sequence estimation algorithm to provide an estimate ŝ(k) of the transmitted signal sequence ŝ(k).

It is important in the system 10 that the transmitter 12 and receivers 18 be well synchronized (i.e., phase aligned). It is also important that the local frequency generator for each receiver 18 be locked very accurately to the transmission frequency of the transmitter 12. It is known in the art for each receiver 18 to implement an automatic frequency control (AFC) algorithm for the purpose of calculating a frequency and phase error for each sample of the received signal. Appropriate corrections to the local oscillator frequency of the receiver 18 and the phase of the received signal are then made. Such frequency and phase corrections are typically implemented as a part of a Viterbi equalizer/symbol detector provided within each receiver 18. For example, such a receiver 18 for a single antenna 16 system is disclosed in U.S. Pat. No. 5,136,616, issued Aug. 4, 1992 to Paul W. Dent. In one implementation of such an automatic frequency control receiver, distinct frequency estimators are used for each Viterbi state. Alternatively, one frequency estimator corresponding to the best Viterbi state is used.

The foregoing single antenna implemented automatic frequency control process has been extended for use in multi-antenna communications systems, like the system 10 of FIG. 1, having interference rejection combining (IRC) processing. The use of independent automatic frequency control processing with respect to each one of a plurality of antennas 16 and receivers 18 (i.e., on each individual receiver chain) has, however, caused a degradation of system performance with respect to bit error rates (see, FIG. 5A and subsequent discussion). This degradation is especially prominent for received signals having low Doppler speeds. Accordingly, there is a need for an improved automatic frequency control processing method and apparatus suitable for use in conjunction with multi-antenna communications systems implementing interference rejection combining processing.

SUMMARY OF THE INVENTION

To address the foregoing need, the present invention implements a joint automatic frequency correction to received signals output from a plurality of receiver chains. A frequency offset is computed and applied on a sample by sample basis to each of the received signals to generate corresponding frequency corrected received signals. These corrected signals are then collected and processed to produce an estimate of the originally transmitted information symbol sequence.

The frequency offset is re-calculated for each sample within a slot of the received signals, and is determined by adding a frequency offset estimate determined for a prior slot to a residual frequency correction determined for a prior sample within the current slot. The frequency offset estimate is determined by adding the residual frequency correction for a last sample in a slot to the frequency offset estimate for a previous slot thereto. The residual frequency correction is determined for each sample within a slot by determining a phase error between the frequency corrected signals and corresponding symbol detection estimates of the frequency corrected signals, and then converting the phase error to a frequency.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
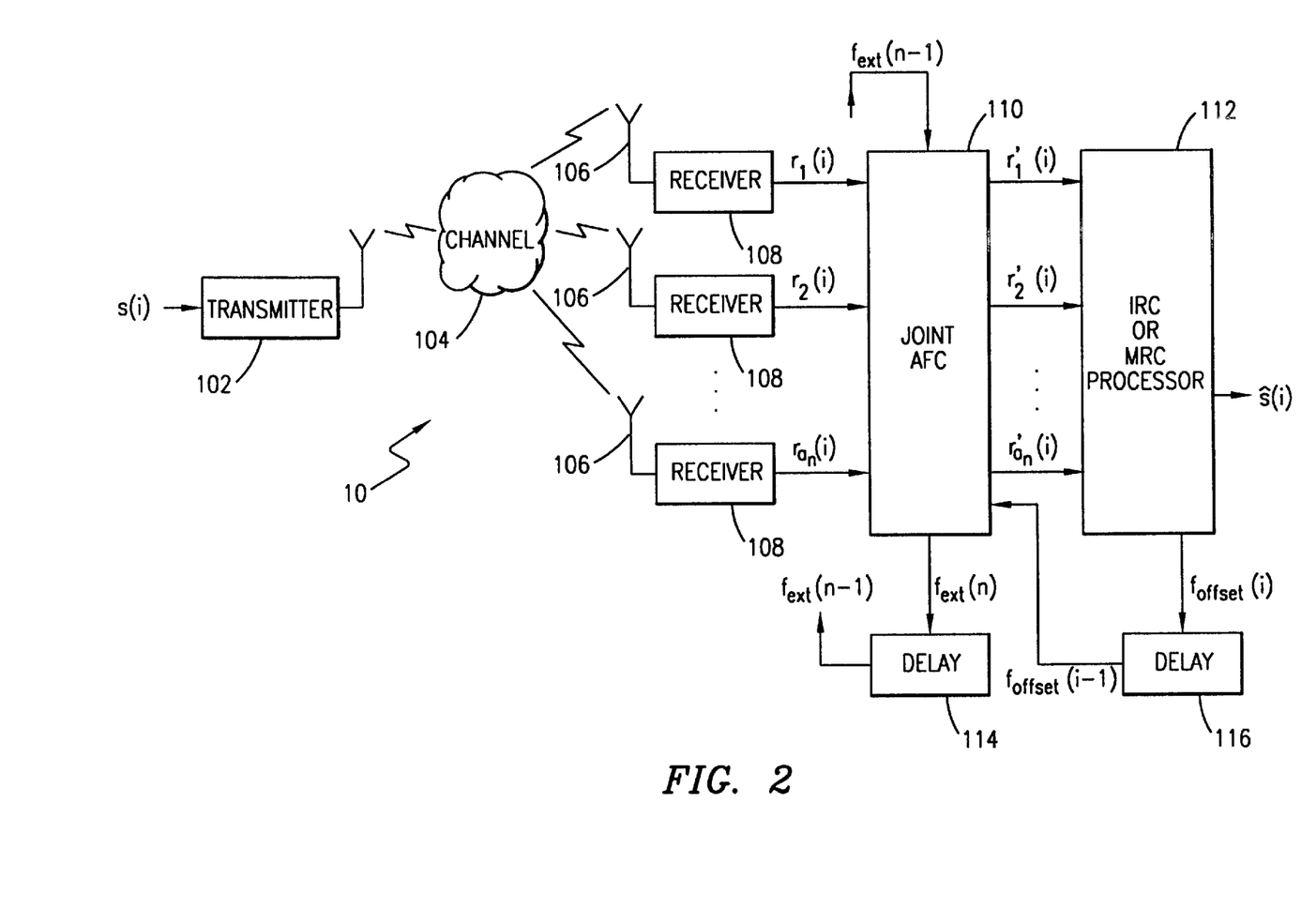
FIG. 2 is a block diagram of a multi-antenna communications system in accordance with the present invention implementing joint automatic frequency control (AFC) across all receiver chains and interference rejection combining (IRC) or maximal ratio combining (MRC) processing.

Reference is now made to FIG. 2 wherein there is shown a block diagram of a multi-antenna communications system 100 in accordance with the present invention. An information symbol sequence s(i) is pulse shaped and modulated onto a radio frequency carrier by a radio transmitter 102. The modulated and transmitted signal passes through a radio frequency channel 104. The transmitted signal (including its echoes and interference) is received by a plurality of antennas ($a_1$ through $a_n$) 106. A receiver 108 associated with each antenna 106 filters and down-converts the received signal to a complex baseband received signal sequence r(i). The received signal sequences $r_1(i)$, $r_2(i)$, . . . ,$r_{adi\ n}(i)$ output from the receivers 108 are jointly processed by an automatic frequency correction (AFC) unit 110 to correct for a common frequency offset that exists across the receivers (i.e., the individual receiver chains), assuming that the receiver chains are locked to a common reference oscillator, and output a plurality of corresponding frequency corrected received signal sequences $r'_1(i)$, $r'_2(i)$, . . . ,$r'_{a_n}(i)$. The frequency corrected received signal sequences $r'_1(i), r'_2(i), \ldots, r'_{a_n}(i)$ are then collected and processed by an interference rejection combining (IRC) or maximal ratio combining (MRC) processor 112 to produce an estimate ŝ(i) of the originally transmitted information symbol sequence s(i).

The joint automatic frequency correction unit 110 determines a frequency offset ($f_{offset}$) to be applied to each of the received signal sequences $r_1(i), r_2(i) \ldots, r_{a_n}(i)$ in accordance with the following equation:

$$f_{offset} = f_{ext}(n-1) + f_{offset}(i-1) \qquad (1)$$

wherein:

$f_{ext}(n-1)$ comprises a frequency offset estimate determined by the joint automatic frequency correction unit 110 for a prior slot n−1, and applied to a current slot n (and each sample i therein) of the received signal sequences $r_1(i)$, $r_2(i)$, . . . $r_{a_n}(i)$; and $f_{offset}(i-1)$ comprises a residual frequency correction generated by the processor 112 for a prior sample i-i within the current slot n of the received signal sequences $r_1(i)$, $r_2(i)$, . . . ,$r_{a_n}(i)$, and applied to a current sample i within the current slot of the received signal sequences $r_1(i)$, $r_2(i)$ . . ., $r_{a_n}(i)$ ; and i=1, 2, . . . ,N; with N being equal to the number of samples in a single slot. Accordingly, the system 100 further includes a first delay 114 positioned to receive the current slot frequency offset estimate $f_{ext}(n)$ determined by the joint automatic frequency correction unit 110, and delay its subsequent application to the joint automatic frequency correction unit as the frequency offset estimate $f_{ext}(n-1)$ for the next slot. The system also includes a second delay 116 positioned between the processor 112 and the joint automatic frequency correction unit 110 to receive the current sample residual frequency correction $f_{offset}(i)$, and delay its subsequent application to the joint automatic frequency correction unit as the residual frequency correction $f_{offset}(i-1)$ for the next sample.

The frequency offset estimate $f_{ext}(n)$ determined by the joint automatic frequency correction unit 110 for a next slot is related to the residual frequency correction $f_{offset}(i)$ generated by the processor 112 in that:

$$f_{ext}(n) = f_{ext}(n-1) + f_{offset}(N) \qquad (2)$$

wherein:

$f_{ext}(n-1)$ comprises the frequency offset estimate determined by the joint automatic frequency correction unit 110 for a prior slot and used after delay 114 in processing the current slot; and $f_{offset}(N)$ comprises the residual frequency correction generated by the processor 112 for the N-th (i.e., the last) sample of the current slot.

Figures 3, 4:
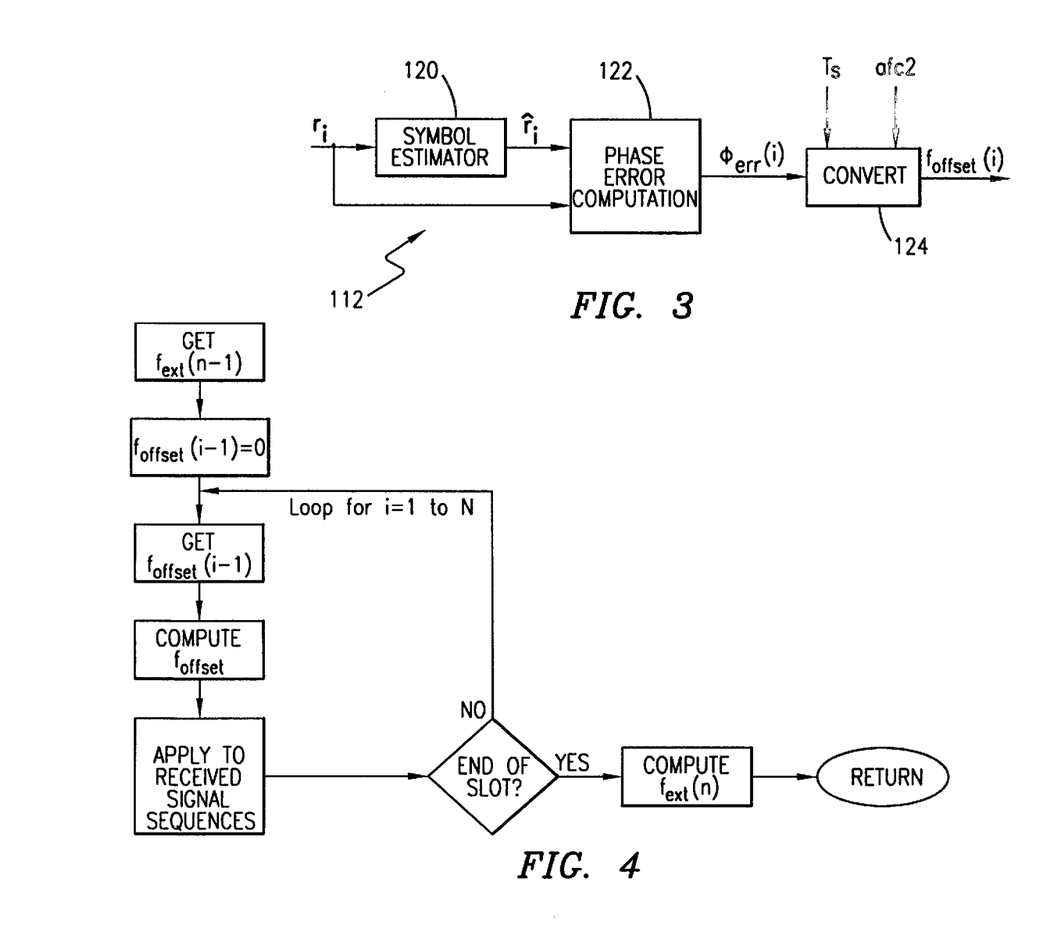
FIG. 3 is a block diagram of a portion of the interference rejection combining processor of FIG. 2.
FIG. 4 is a flow diagram illustrating operation of the joint automatic frequency correction unit and combining processor of FIGS. 2 and 3.

Reference is now made to FIG. 3 wherein there is shown a block diagram of a portion of the processor 112. The processor 112 receives and processes the frequency corrected received signal sequences $r'_1(i), r'_2(i) \ldots, r'_{a_n}(i)$ using a sequence estimator (not shown) of well known design to generate the estimate ŝ(i) of the received sequence. The processor 112 also processes the frequency corrected received signal sequences $r'_1(i), r'_2(i) \ldots r'_{a_n}(i)$ to generate, for each sample i, the residual frequency correction $f_{offset}(i)$ for output to delay 116 (FIG. 2).

The frequency corrected received signal sequences may be designated in vector format as follows:

$$r_i' = (r_1'(i), r_2'(i), \ldots, r_{a_n}'(i))$$

The processor 112 utilizes an estimator 120 in processing the frequency corrected received signal sequences $r'_1(i)$, $r'_2(i), \ldots, r'_{a_n}(i)$ of the vector $r_i'$ to estimate the received signals based on symbol detection and generate estimated received signal sequences $\hat{r}_1(i), \hat{r}_2(i), \ldots, \hat{r}_{a_n}(i)$.

The estimated received signal sequences may be designated in vector format as follows:

$$\hat{r}_i = (\hat{r}_1(i), \hat{r}_2(i), \ldots, \hat{r}_{a_n}(i))$$

The sequences of the vector $r_i'$ and the vector $\hat{r}_i$ are then applied to a phase error computation unit 122 to calculate a phase error $\hat{\phi}_{err}(i)$ for the sample in accordance with the following equation:

$$\hat{\phi}_{err}(i) = arg[r_i^H R_{zz}^{-1}(i) \hat{r}_i] \qquad (3)$$

wherein:

$R_{zz}^{-1}(i)$ is the inverse of the estimated impairment autocorrelation (two-dimensional) matrix $R_{zz}(i)$ calculated by the IRC algorithm;

and $r_i^H$ denotes the conjugate transpose of the vector $r_i'$.

A small angle approximation for the phase error angle estimate is given by the following equation:

$$\hat{\phi}_{err}(i) = Im[r_i^H R_{zz}^{-1}(i) \hat{r}_i] \cdot \frac{1}{|r_i^H R_{zz}^{-1}(i) \hat{r}_i|} \qquad (4)$$

In practice, even this approximation may be too complex to implement. One method of simplifying this calculation is to perform a k-bit division for the denominator part of Equation (4). A more simple approximation is to use only the sign of the result as the estimate of the phase error in accordance with the following equation:

$$\hat{\phi}_{err}(i) = sign[Im(r_i^H R_{zz}^{-1}(i) \hat{r}_i)] \qquad (5)$$

An example of the use of the Equation (5) approach for n antennas ($a_1$ to $a_n$), and assuming no interferer, is provided in accordance with the following equation:

$$\hat{\phi}_{err}(i) = \text{sign}\left(\sum_{n=1}^{a_n}\left[\sum_{m=1,m\neq n}^{a_n} N_{a_n}\right][Im(r_i')Re(\hat{r}_i) - Re(r_i')Im(\hat{r}_i)]\right) \quad (6)$$

wherein: $N_{a_n}$ is the measured noise power on antenna $a_n$ (comprising the diagonal entries of the autocorrelation matrix $R_{zz}(i)$).

It is further noted that in those instances where maximal ratio (diversity) combining (MRC), rather than interference rejection combining is preferred, the processor 112 may instead implement such combining also taking advantage of the joint automatic frequency correction. For this implementation:

$$R_{zz}^{-1}(i) = \begin{bmatrix} \frac{1}{N_{a_1}} & \cdots & 0 \\ & & \\ 0 & \cdots & \frac{1}{N_{a_n}} \end{bmatrix} \quad (7)$$

wherein: $N_{a_n}$ is the measured noise power on antenna $a_n$ (comprising the diagonal entries of the autocorrelation matrix $R_{zz}(i)$); or:

$$R_{zz}^{-1}(i) = I \quad (8)$$

wherein: I is the identity matrix.

Once $\hat{\phi}_{err}(i)$ is calculated, it is output from the phase error computation unit 122 to a conversion unit 124 where the phase is converted to a residual frequency correction $f_{offset}(i)$ in accordance with the following equation:

$$f_{offset}(i) = afc2 * \hat{\phi}_{err}(i) * \frac{1}{T_s} \quad (9)$$

wherein:

afc2 is a parameter that sets the maximum allowed value for $|f_{offset}(i)|$, i.e., a limiting operation that limits the maximum change in the frequency correction term at sample i; and $T_s$ is the sampling rate.

The resulting residual frequency correction $f_{offset}(i)$ is then output from the processor 112 to the delay 116 (FIG. 2) for subsequent application to the joint automatic frequency correction unit 110 for use as $f_{offset}(i-1)$ in processing the next sample.

Reference is now again made to both FIGS. 2 and 3, and is also made to FIG. 4 wherein there is shown a flow diagram illustrating operation of the joint automatic frequency correction unit 110 and processor 112 in processing the received signal sequences $r_1(i), r_2(i) \ldots, r_{a_n}(i)$. Operation of the joint automatic frequency correction unit 110 and processor 112 occurs as follows:

1. at the beginning of a slot, get $f_{ext}(n-1)$ from delay 114 (generated by the joint automatic frequency correction unit 110 for the prior slot);
2. initialize $f_{offset}(i-1)$ to zero;
3. loop for each sample i (for i=1,2, ... ,N) in the current slot,
   a. get $f_{offset}(i-1)$ from delay 116 as calculated by the processor 112 for a prior sample of the current slot,
   b. compute the frequency offset ($f_{offset}$) using Equation (1),
   c. apply computed $f_{offset}$ to the current sample of the received signal r(i) to generate the corresponding frequency corrected received signal sequences $r'_1(i), r'_2(i), \ldots, r'_{a_n}(i)$, and
   d. process the frequency corrected received signal sequences $r'_1(i), r'_2(i), \ldots r'_{a_n}(i)$ by the processor 112 to produce an estimate $\hat{s}(i)$ and also generate $f_{offset}(i)$ for output to delay 116;

4. at the end of the data slot, compute $f_{ext}(n)$ using Equation (2) and output result to delay 114 for use in connection with processing the next slot; and
5. return to step 1 above, and repeat for processing the next slot.

Figure 5A:
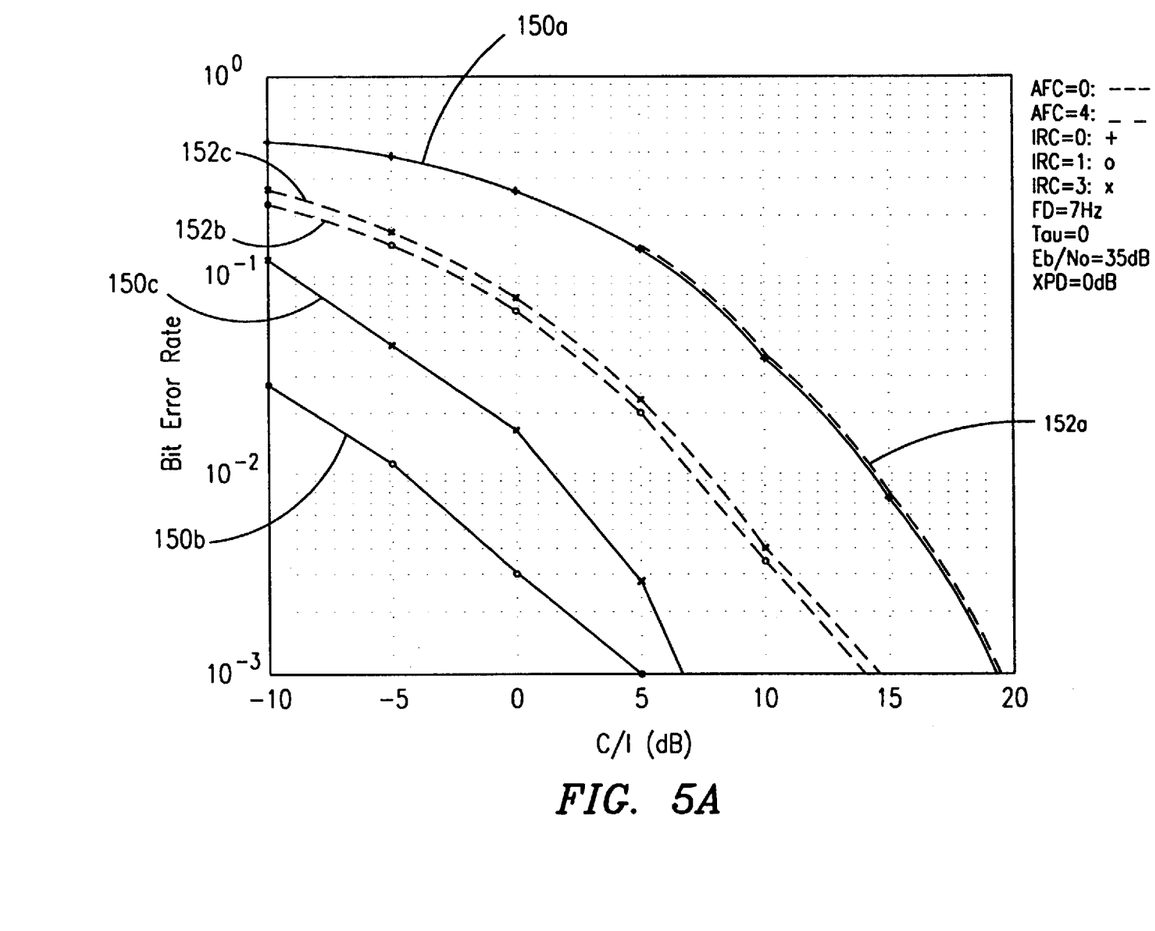
FIGS. 5A are 5B are graphs for processing simulations illustrating bit error rate system performance utilizing multi-antenna communications systems.
Figure 5B:
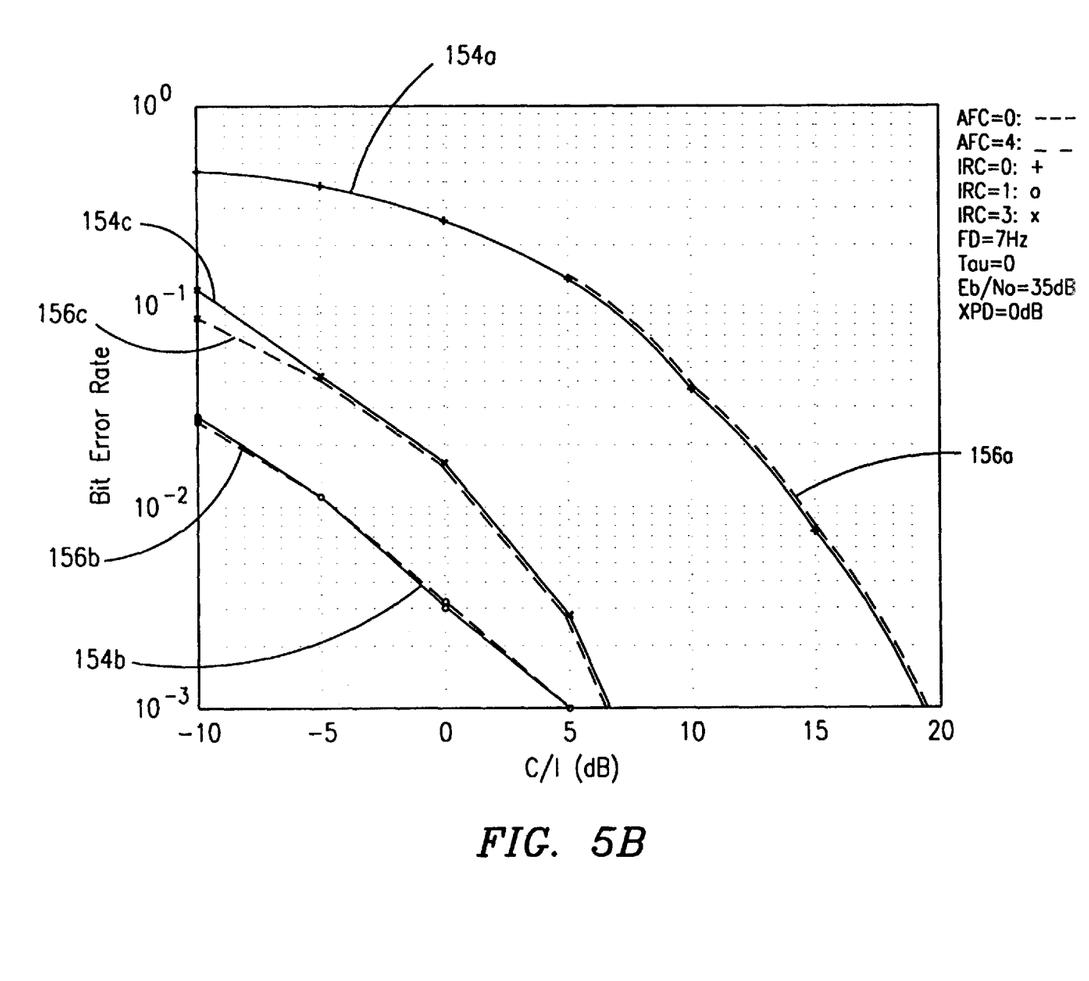

Reference is now made to FIGS. 5A are 5B wherein graphs illustrating bit error rate system performance for processing simulations when utilizing multi-antenna communications systems. In particular, FIG. 5A illustrates system performance for processing simulations when automatic frequency control (AFC) is independently implemented on each receiver chain as in prior art FIG. 1. Conversely, FIG. 5B illustrates system performance for processing simulations when joint automatic frequency control (AFC) is implemented across the receiver chains as in FIG. 2. In each of the illustrations, the vertical axis relates the bit error rate (BER) for system communications in a logarithmic scale, while the horizontal axis relates the carrier to interference (C/I) ratio in decibels (dB). It is not surprisingly noted from a review of the graphs that as the carrier to interference ratio increases, the bit error rate decreases.

Referring now specifically to FIG. 5A, two modes of system operation are illustrated. In the first mode, whose system operation is illustrated by the solid lines 150, no use of automatic frequency correction (AFC) is made because perfect knowledge of frequency error is assumed. In the second mode, however, whose system operation is illustrated by the dashed lines 152, independent automatic frequency correction is implemented on each receiver chain. Three operating scenarios are illustrated for each of the two modes. In a first scenario, denoted by a suffix "a", no interference rejection combining (IRC) is implemented. In a second scenario, denoted by a suffix "b", a first (IRC=1) full correlation matrix estimate interference rejection combining approach is implemented. Finally, in a third scenario, denoted by a suffix "c", a second (IRC=3) sub-optimal correlation matrix estimate interference rejection combining approach is implemented. The graph of FIG. 5A illustrates that system performance degrades from that when perfect knowledge of frequency error is assumed if independent AFC is implemented on each receiver chain in combination with interference rejection combining (see, solid lines 150b and 150c in comparison to dashed lines 152b and 152c).

Referring now specifically to FIG. 5B, two modes of system operation are again illustrated. As before, in the first mode, whose system operation is illustrated by the solid lines 154, no use of automatic frequency correction (AFC) is made because perfect knowledge of frequency error is assumed. In the second mode, however, whose system operation is illustrated by the dashed lines 156, joint automatic frequency correction across the receiver chains in accordance with the present invention is implemented. Again, as before, three operating scenarios are illustrated for each of the two modes. In a first scenario, denoted by a suffix "a", no interference rejection combining (IRC) is implemented. In a second scenario, denoted by a suffix "b", a first (IRC=1) full correlation matrix estimate interference rejection combining approach is implemented. Finally, in a third scenario, denoted by a suffix "c", a second (IRC=3) sub-optimal correlation matrix estimate interference rejection combining approach is implemented. The graph of FIG. 5B illustrates that system performance does not significantly degrade (see, in comparison to FIG. 5A) when implementing the joint AFC approach of the present invention. In fact, the processing simulations indicate that system performance utilizing joint AFC in combination with interference rejection combining approaches the performance obtained when perfect knowledge of frequency error is assumed (see, solid lines 154b and 154c in comparison to dashed lines 156b and 156c).

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. Apparatus for processing a broadcast signal representing an information symbol sequence, comprising:
    a first antenna for receiving the broadcast signal;
    a first receiver connected to the first antenna for processing the received broadcast signal to output a first received signal;
    a second antenna for receiving the broadcast signal;
    a second receiver connected to the second antenna for processing the received broadcast signal to output a second received signal, wherein each of the first and second received signals comprises a plurality of slots, and each slot comprises a plurality of samples;
    means connected to the first and second receivers for jointly implementing an automatic frequency correction (AFC) process on the first and second received signals to output corresponding first and second frequency corrected signals;
    means for adding a frequency offset estimate determined for a prior slot to a residual frequency correction determined for a prior sample within a current slot, to determine a frequency offset value for application to a current sample within the current slot of the first and second received signals; and
    means for applying the frequency offset value to both the first and second received signals to generate the corresponding first and second frequency corrected signals.

2. The apparatus as in claim 1 further including means for determining the frequency offset estimate for use in processing the current slot comprising means for adding the frequency offset estimate determined for the prior slot to the residual frequency correction determined for a last sample within the prior slot.

3. The apparatus as in claim 1 further including means for determining the residual frequency correction, comprising:
    means for computing a phase error between the frequency corrected signals and symbol detection estimates of the frequency corrected signals; and
    means for converting the phase error to a frequency for output as the residual frequency correction.

4. The apparatus as in claim 1 further including means for performing interference rejection combining (IRC) on the first and second frequency corrected signals to output an estimate of the information symbol sequence.

5. The apparatus as in claim 1 further including means for performing maximal ratio combining (MRC) on the first and second frequency corrected signals to output an estimate of the information symbol sequence.

6. A method for processing a broadcast signal representing an information symbol sequence, comprising the steps of:
    receiving the broadcast signal at a first antenna using a first receiver to output a first received signal;
    receiving the broadcast signal at a second antenna using a second receiver to output a second received signal, wherein each of the first and second received signals comprises a plurality of slots, and each slot comprises a plurality of samples; and
    jointly implementing an automatic frequency correction (AFC) process on the first and second received signals to output corresponding first and second frequency corrected signals by adding a frequency offset estimate determined for a prior slot to a residual frequency correction determined for a prior sample within a current slot, to determine a frequency offset value for application to a current sample within the current slot of the first and second received signals, and applying the frequency offset value to both the first and second received signals to generate the corresponding first and second frequency corrected signals.

7. The method as in claim 6 further including the step of:
    performing interference rejection combining (IRC) on the first and second frequency corrected signals to output an estimate of the information symbol sequence.

8. The method as in claim 6 further including the step of:
    performing maximal ratio combining (MRC) on the first and second frequency corrected signals to output an estimate of the information symbol sequence.

9. The method as in claim 6 further including the step of determining the frequency offset estimate for use in processing the current slot, wherein this step comprises the step of:
    adding the frequency offset estimate determined for the prior slot to the residual frequency correction determined for a last sample within the prior slot.

10. The method as in claim 6 further including the step of determining the residual frequency correction, comprising the steps of:
    computing a phase error between the frequency corrected signals and symbol detection estimates of the frequency corrected signals; and
    converting the phase error to a frequency for output as the residual frequency correction.

11. A frequency error correction system, comprising:
    means for receiving a first stream of samples from a first antenna and outputting a first received sample stream;
    means for receiving a second stream of samples from a second antenna and outputting a second received sample stream, wherein each of the first received sample stream and second received sample stream includes a plurality of slots, and each slot includes a plurality of samples;
    means for processing the first and second received sample streams to estimate a common frequency error by adding a frequency error determined for a prior slot to a residual frequency error correction determined for a prior sample within a current slot, thereby determining a frequency offset for application to a current sample within the current slot of the first and second received sample streams; and
    means for applying the frequency offset to the first and second received sample streams to correct for the determined common frequency error.

12. The system as in claim 11 further including means for performing interference rejection combining (IRC) on the first and second frequency corrected received sample streams.

13. The system as in claim 11 further including means for performing maximal ratio combining (MRC) on the first and second frequency corrected received sample streams.

14. The system as in claim 11 wherein the means for processing comprises means for determining the common frequency error for a prior sample of the first and second received sample streams to give the frequency offset for application to a current sample of the first and second received sample streams.

* * * * *

UNITED STATES PATENT AND TRADEMARK OFFICE
CERTIFICATE OF CORRECTION

PATENT NO. : 5,878,093
DATED : March 2, 1999
INVENTOR(S) : K. J. Molnar et al.

It is certified that error appears in the above-identified patent and that said Letters Patent is hereby corrected as shown below:

<u>Column 3,</u>
Line 20, replace "$r_{adi\ n}(i)$" with -- $^r a_n(i)$ --
Line 47, replace "i-i" with -- i-1 --

Signed and Sealed this

Twenty-sixth Day of March, 2002

Attest:

Attesting Officer

JAMES E. ROGAN
*Director of the United States Patent and Trademark Office*